United States Patent Office 3,545,972
Patented Dec. 8, 1970

3,545,972
ADHESIVE SUBBING LAYER FOR A
PHOTOGRAPHIC EMULSION
Alex Wasy D'Cruz, Somerset, N.J., assignor to E. I. du Pont de Nemours and Company, Wilmington, Del., a corporation of Delaware
No Drawing. Continuation-in-part of application Ser. No. 547,152, May 3, 1966. This application Jan. 14, 1969, Ser. No. 791,164
Int. Cl. G03c 1/80
U.S. Cl. 96—87                    8 Claims

ABSTRACT OF THE DISCLOSURE

Photographic films comprising an organic polymer film bearing a sublayer of a tricomponent copolymer of (a) an alkyl acrylate or methacrylate, (b) an aliphatic difunctional monomeric compound with at least two unsaturated groups, e.g., vinyl or allyl such as allyl acrylate and diallyl malonate, and (c) itaconic, fumaric, acrylic or methacrylic acid and a water-permeable silver halide emulsion layer. The films have excellent adherence between layers.

---

This application is a continuation-in-part of my application Ser. No. 547,152 filed May 3, 1966, now abandoned.

This invention relates to photographic film having a novel, single anchoring substratum (commonly known as a subbing layer or sub) which is applied to polyester after stretching. Still more particularly, it relates to such a photographic film having an oriented (biaxially stretched) polyethylene terephthalate film base.

Photographic film supports made from polyesters such as polyethylene terephthalate have relatively hydrophobic surfaces, and do not adhere well to hydrophilic coatings containing gelatin or other natural or synthetic water-permeable organic colloid binding agents. Because the polyester surface may be relatively chemically inert, it is not dissolved by customarily used coating solvents; and, therefore, a mechanical interlocking of coating and support cannot be readily obtained.

There are two current methods of subbing polyester base. One method consists of a two step process; the first step requires subbing the cast base before stretching (biaxial orientation) with an aqueous emulsion and the second step involves the application of the gel sub on the stretched base. Alles et al., U.S. Pat. 2,627,088 and Swindells, U.S. Pat. 2,698,235. Since this subbing system necessitates application of a resin sub before stretching, this impedes salvage of film base which may have defects because the sub interferes with scrap recovery. Furthermore, it would be desirable to find a method of subbing the polyester base following the step of stretching so as not to subject the sublayer to unnecessary abrasion.

The second method of subbing polyester has been to sub the stretched base, which usually has been treated with electrical discharge with a copolymer subbing composition in a non-aqueous solvent. These subbing systems are undesirable because they employ toxic and flammable solvents. Furthermore, economic use of these systems necessitates recovery of the solvent with attendant expensive plant investment.

This invention is accomplished by the formation of a coated polyester support having as its coating composition an unsaturated ester-aliphatic difunctional compound-unsaturated acid copolymer. The copolymer components being respectively present in amounts of about 70–110, 6–20 and 3–30 parts by weight. The polyester support can be either oriented or unoriented. The coated supports of this invention form exceptionally good wet and dry anchorage for gelatin coatings, e.g., gelatin subbing treatments, non-halation layers and photographic emulsions.

The unsaturated ester may be an alkyl acrylate such as methyl arcylate, ethyl acrylate, propyl acrylate, butyl acrylate, etc. Preferably, the alkyl radical is no greater than four carbon atoms.

The aliphatic difunctional monomer generally has a total carbon content of less than 25 carbon atoms and may be any allyl and/or vinyl ester of unsaturated monoorganic acid such as allyl acrylate and allyl methacrylate; an ester of a saturated dicarboxylic organic acid, e.g., diallyl oxalate, diallyl sebacate or a difunctional ester of an unsaturated dicarboxylic acid where the difunctional groups are one of each or both vinyl or allyl. Other difunctional monomers which are useful are difunctional ethers where the functional groups are either allyl or vinyl; or one of each; difunctional or trifunctional amines, where the functional groups are allyl or vinyl; or difunctional sulfones, sulfites, sulfates, phosphines, phosphates, phosphites, or other inorganic acids, where the difunctional groups are either allylic or vinylic.

The third component may be an unsaturated acid having low water solubility, such as itaconic acid, fumaric acid or acrylic acid, methacrylic acid.

The copolymer may be made by any convenient method well known to the art. For example, an aqueous emulsion of the components may be polymerized to produce a polymer latex.

The polymer latex is coated onto the biaxially oriented polymer and dried at 100°–150° C. The initial pH of the polymer latex is approximately 3. Adhesion with a single sub system is greatly improved when the aqueous emulsion is applied to a polyester base which has been treated with electrical discharge, flame treatment, surface oxidation, ultraviolet light exposure, and the like.

The invention will now be illustrated, but is not intended to be limited, by the following Procedures and Examples.

PROCEDURE A

A subbing composition comprising methyl acrylate, diallyl malonate and itaconic acid was prepared as follows:

The following were placed in a suitable vessel:

| | Parts by wt. |
|---|---|
| Methyl acrylate (deinhibited) [1] | 100 |
| Diallyl malonate | 10 |
| Itaconic acid | 6 |
| 30% sodium lauryl sulfate in water (by weight) | 5 |
| Water | 300 |

[1] With activated alumina.

The mixture is stirred and purged with nitrogen in a vessel provided with a reflux condenser for about 15 minutes. The temperature of the reaction mixture is raised to 75° C., and 0.5 parts per weight of ammonium persulfate dissolved in 10 parts by weight water was added. The milky white slightly colored solution immediately becomes translucent upon the addition of ammonium persulfate and temperature in the flask rises to 80° C. The reaction temperature is maintained at between 70° and 80° C. for 1 hour. A milky white, aqueous dispersion is obtained.

PROCEDURE B

The composition is made in a manner similar to the composition of Procedure A except 14 parts by weight of allyl methacrylate is used in place of the diallyl malonate. A milky white, aqueous dispersion is obtained.

PROCEDURE C

The composition is made in a manner similar to the composition of Procedure A except 15 parts by weight of diallyl oxalate is used in place of the diallyl malonate. A milky white, aqueous dispersion is obtained.

PROCEDURE D

The composition is made in a manner similar to the composition of Procedure A except 15 parts by weight of diallyl malonate is used, and 95 parts by weight of ethyl acrylate is used in place of the methyl acrylate. A milky white, aqueous dispersion is obtained.

PROCEDURE E

The composition is made in a manner similar to the composition of Procedure A except 10 parts by weight of diallyl succinate is used in place of the diallyl malonate. A milky white, aqueous dispersion is obtained.

PROCEDURE F

The composition is made in a manner similar to the composition of Procedure A except 10 parts by weight of allyl acrylate is used in place of the diallyl malonate. A milky white, aqueous dispersion is obtained.

PROCEDURE G

The composition is made in a manner similar to the composition of Procedure A except 14 parts by weight of diallyl sebacate is used in place of the diallyl malonate.

PROCEDURE H

The composition is made in a manner similar to the composition of Procedure A except 100 parts by weight of n-butyl acrylate is used in place of the methyl acrylate, and 10 parts by weight of allyl methacrylate is used in place of the diallyl malonate. A milky white, aqueous dispersion is obtained.

PROCEDURE I

The composition is made in a manner similar to the composition of Procedure A except 6 parts by weight of allyl methacrylate and 8 parts by weight of diallyl malonate is used. A milky white, aqueous dispersion is obtained.

PROCEDURE J

The composition is made in a manner similar to the composition of Procedure A except 8 parts by weight of 1,4-divinyl oxybutane is used in place of the diallyl malonate.

EXAMPLE 1

Polyethylene terephthalate films were cast and biaxially stretched about 3 times in unit length and width at a temperature of about 88° C. to provide a final thickness of about 0.004 and 0.007 inch respectively, and then heat-set after the manner described in Example I of Alles, U.S. Pat. 2,779,684.

The surface of the film was then treated with electrical discharge after the manner described in Travers, U.S. Pat. 3,113,208. The rods were charged by a high voltage generator at 1.4 amps and 1100 watts and 10,000 volts.

Material prepared as described in Procedure A was diluted with distilled water to a concentration of 3% solids. The resulting aqueous dispersion was then used to coat one side of each of the biaxially oriented polyethylene terephthalate films. Coating was accomplished by the air knife technique; the polymer coating mixture temperature was 95° F. The coated films were then heat relaxed at 150° C. as described in U.S. Pat. 2,779,684 for 2 minutes. A gelatino-silver halide photographic emulsion of the lithographic type was then coated on each of the polymer coated surfaces. The emulsion comprised 52 mg. gelatin per 82 mg. silver halide; (30 mole percent AgBr and 70 mole percent AgCl) and hardening restrainers such as 2,4-dihydroxybenzaldehyde and polyhydroxybenzene as described in Harriman, U.S. Pat. 2,591,542.

The films were found to have excellent wet anchorage when tested by exposing samples to white light, processing in a standard lithographic developer of the hydro quinone-paraformaldehyde type, fixing, and after washing, but before drying, scribing two lines 2 inches long and ½ inch apart through the emulsion layer with a phonograph needle and rubbing across the marks with a rubber squeegee. The coating showed no tendency to peel from either base. The test for dry anchorage was made by taking a sample film, coated as above, exposing it to white light, and processing as described above. The processed and dried sample was then scored with a phonograph needle to produce four parallel scratches through the emulsion layer ¼ inch apart. A series of lines was then scored across these lines at an angle of about 60° to them and about ¼ inch apart to produce 3 lines of 9 rhomboid figures scratched through the emulsion layer. A piece of cellophane, pressure-sensitive, adhesive tape was then passed down over the scored area and a loose end of the tape grasped at about a 90° angle to the film surface. The tape was pulled up briskly and an arbitrary measure of adhesion obtained by comparing each group of 10 samples with a graded series of standards prepared with films having excellent to very poor anchorage. The arbitrary scale ranges from a value of 0 for excellent anchorage to 10 for very poor anchorage. Tested in this manner, the samples of experimental film were rated from 0 to 1 on the arbitrary scale, which was excellent.

EXAMPLE 2

Films were made in a manner similar to the films of Example 1, except the polymer subbing dispersion, prepared as described in Procedure A, was adjusted to 8.5% polymer solids. When tested as described in Example 1, the results were equivalent to those obtained in Example 1.

EXAMPLE 3

A series of films was prepared similar to the films of Examples 1 and 2 in which the polymer subbing compounds were the materials prepared as described in Procedures B, C, D, E, F, G, H, I and J. Tested in the manner of Example 1, the sample films prepared with the subbing layers of Procedures B, C, E, F, G, I and J gave excellent wet anchorage adhesion and rated on the arbitrary scale, 0–1 for dry adhesion, which was excellent. Films prepared with the subbing composition as described in Procedure H gave excellent wet adhesion; H rated 3–4 for dry adhesion. Films prepared with the subbing composition as described in Procedure D gave wet and dry adhesion of fair and good ratings, respectively.

EXAMPLE 4

A series of films was made as described in Example 3, except that the surface of the films was subjected to flame treatment after the manner described in Bryan, U.S. Pat. 3,145,242, rather than subjected to electrical discharge.

The surface of a polyethylene terephthalate film was treated with an air-propane flame and then coated with a methyl acrylate/diallyl malonate/itaconic acid (90/10/10) polymer diluted to 6% solids. Tested in the manner of Example 1, the results were equivalent to those obtained in Example 1.

EXAMPLES 5-14

| Example | Copolymer | Respective parts monomer before polymerization | Anchorage Wet | Dry |
|---|---|---|---|---|
| 5 | Methyl acrylate/diallyl itaconate/itaconic acid | 100-7-6 | Excellent | 0-1 |
| 6 | Methyl acrylate/diallyl fumarate/itaconic acid | 100-8-6 | ___do___ | 0-1 |
| 7 | Methyl acrylate/allyl methacrylate/maleic and fumaric acid | 100-10-6 | Good | 0-1 |
| 8 | Methyl acrylate/divinyl sulfone/itaconic acid | 100-8-4 | Excellent | 0-1 |
| 9 | Methyl acrylate/divinyl sulfite/itaconic acid | 100-8-4 | ___do___ | 0-1 |
| 10 | Methyl acrylate/triallyl amine/itaconic acid | 100-8-4 | Good | 0-1 |
| 11 | Methyl acrylate/1,1,1-trimethylol propane trimethacrylate itaconic acid | 100-8-4 | Fair | 3-4 |
| 12 | Methyl acrylate/1,4-divinyloxybutane/itaconic acid | 100-8-6 | Good | 0-1 |
| 13 | Methyl acrylate/vinyl methacrylate/itaconic acid | 100-8-6 | ___do___ | 0-1 |
| 14 | Methyl acrylate/1,1,3,3-tetraallyl oxypropane/itaconic acid | 100-6-6 | ___do___ | 2-3 |

The copolymers are prepared in a manner similar to the composition of Procedure A and are coated on stretched electrical discharge treated polyethylene terephthalate in a manner similar to Example 1. Adhesion is tested in a similar manner to Example 1.

Other surface treatments for enhancing adhesion may be employed. These include treating the surface with peroxides associated with sodium hydroxides; chromic acid in sulfuric acid; and oxygen or ozone in the presence of ultraviolet light according to known procedures.

With any of the above systems, care must be taken to avoid processing the film with formaldehyde or film in which formaldehyde has been placed. Formaldehyde has the deleterious effects of producing excess fog, desensitization, flattening of gradation in the processed film, and after hardening. Formaldehyde also destroys wet anchorage when in contact with the sub layer. If formaldehyde is present or will be used to process the elements, a substance should be placed in the film, etc., to nullify or slow down the effect of the formaldehyde after the manner described in Harriman, U.S. Pat. 2,591,542.

These polymers are preferably applied to the biaxially stretched base after it has been treated, e.g., by electrical discharge. The base with the sub applied to it is heat relaxed at a minimum of 125° C. for 3 minutes and a maximum of 180° C. for 1 minute.

The film support for the emulsion layers used in the novel process may be any suitable transparent synthetic polymeric material. For example, the cellulosic supports, e.g., cellulose acetate, cellulose triacetate, cellulose acetate butyrate, etc., may be used. Polymerized vinyl compounds, e.g., copolymerized vinyl acetate and vinyl chloride, polystyrene, and polymerized acrylates may also be mentioned. The film formed from the polyesterification product of a dicarboxylic acid and a dihydric alcohol made according to the teachings of Alles, U.S. Pat. 2,779,684 and the patents referred to in the specification of that patent are eminently satisfactory. Other suitable supports are the polyethylene terephthalate/isophthalates of British Pat. 766,290 and Canadian Pat. 562,672 and those obtainable by condensing terephthalic acid and dimethyl terephthalate with propylene glycol, diethylene glycol, tetramethylene glycol or cyclohexane 1,4-dimethanol (hexahydro-p-xylene alcohol). The films of Bauer et al., U.S. Pat. 3,052,543, may also be used. The above polyester films are particularly suitable because of their dimensional stability. The polyester films may contain pigments or dyes as known to the art, or may include various matting agents, e.g., silica particles.

The subbing compositions of the present invention are ideally suited for the reception of gelatin coatings, e.g., gelatin subbing treatments, non-halation layers and photographic emulsions.

In place of part or all of the gelatin, other natural or synthetic water-permeable organic colloid binding agents can be used in the intermediate or photographic emulsion layers coated on the substratum layers of the present invention. Such agents include water-permeable or water-soluble polyvinyl alcohol and its derivatives, e.g., partially hydrolyzed polyvinyl acetates, polyvinyl ethers, and acetals containing a large number of extralinear —$CH_2CHOH$— groups; hydrolyzed interpolymers of vinyl acetate and unsaturated addition polymerizable compounds such as maleic anhydride, acrylic and methacrylic acid ethyl esters, and styrene. Suitable mixed colloid emulsions are described in U.S. Pats. Nottorf, U.S. Pats. 3,142,568 issued July 28, 1964 and 3,325,286 issued June 13, 1967; and Cohen and Shacklett, U.S. Pats. 3,252,801 issued May 24, 1966 and 3,203,804 issued Aug. 31, 1965. The useful polyvinyl acetals include polyvinyl acetaldehyde acetal, polyvinyl butyraldehyde acetal and polyvinyl sodium o-sulfobenzaldehyde acetal. Other useful colloid binding agents include poly-N-vinyl lactams of Bolton, U.S. Pat. 2,495,918, the hydrophilic copolymers of N-acrylamido alkyl betaines described in Shacklett, U.S. Pat. 2,833,650 and hydrophilic cellulose ethers and esters.

In addition to serving as substratum anchoring layers for photographic coatings, the coatings of the present invention also provide strongly adherent, flexible substrata for drafting film coatings, e.g., the urea formaldehyde and melamine formaldehyde coatings of Van Stappen 2,964,423 and the matted acrylic coatings of Moede, U.S. Pat. 3,353,958 issued Nov. 21, 1967.

The subbing compositions and/or subsequent coatings can be applied to the web supports or films by any method known to the art, e.g., dip or skim coating, or coating with rollers. Suitable coating methods are shown in Heilman, U.S. Pat. 3,025,828; Wamsley, U.S. Pat. 3,038,441; Brandsma et al., U.S. Pat. 3,063,868; and Haley, U.S. Pat. 3,082,144. Various coating aids and surfactants may be added in the manner known to the art, but must be compatible with the surfactants, if any, already present and not deleterious to subsequently applied coatings, e.g., photographic emulsions. These adhesive coatings generally give a dry coating thickness of about 3 to 3.6 milligrams per square decimeter.

The subbing compositions may contain various pigments and dyes for various purposes, e.g., carbon black, barium sulfate, titanium dioxide, zinc oxide, magnesium oxide, silicon dioxide, phthalocyanines and other organic and inorganic pigments can be used as well as various dyes, e.g., among the dyes useful in the invention are Fuchsine (C.I. 42510), Auramine Base (C.I. 41000B), Calcocid Green S (C.I. 44090), Para Magenta (C.I. 42500), Tryparosan (C.I. 42505), New Magenta (C.I. 42520), Acid Violet RRL (C.I. 42425), Red Violet 5RS (C.I. 42690), Nile Blue 2B (C.I. 51185), New Methylene Blue GG (C.I. 51195), C.I. Basic Blue 20 (C.I. 42585), Iodine Green (CI. 42556), Night Green B (C.I. 42115), C.I. Direct Yellow 9 (C.I. 19540), C.I. Acid Yellow 17 (C.I. 18965), C.I. Acid Yellow 29 (C.I. 18900), Tartrazine (C.I. 19140), Supramine Yellow G (C.I. 19300), Buffalo Black 10B (C.I. 27790), Naphthalene Black 12R (C.I. 20350), Fast Black L C.I. 51215), and Ethyl Violet (C.I. 42600).

The embodiments of the invention in which an exclusive property or privilege is claimed are defined as follows:

1. A photographic film element comprising in order on at least one surface of a synthetic macromolecular organic polymer film base,
    (1) a sublayer of a tri-component copolymer of
        (a) about 70–110 parts by weight of an alkyl acrylate or methacrylate, wherein alkyl contains 1-4 carbon atoms,
   (b) about 6-20 parts by weight of an aliphatic difunctional monomeric compound containing at least two terminal ethylenically unsaturated groups, each being taken from the group consisting of vinyl and allyl groups, and
   (c) about 3-30 parts by weight of an unsaturated acid taken from the group consisting of itaconic, fumaric, acrylic and methacrylic acids; and
(2) a water-permeable organic colloid layer containing light-sensitive silver halide.

2. An element according to claim 1 wherein there is a light-insensitive, water-permeable colloid stratum between layer (1) and layer (2).

3. An element accordingto claim 1 wherein said organic polymer is a polyester.

4. An element according to claim 1 wherein said organic polymer is polyethylene terephthalate.

5. An element according to claim 1 wherein component (a) is methyl acrylate.

6. An element according to claim 1 wherein component (a) is ethyl acrylate.

7. An element according to claim 1 wherein component (b) is allyl acrylate.

8. An element according to claim 1 wherein component (b) is diallyl malonate.

References Cited
UNITED STATES PATENTS

| | | | |
|---|---|---|---|
| 2,956,884 | 10/1960 | Caldwell | 96—87XR |
| 3,317,453 | 5/1967 | MacDonald | 260—80.72 |
| 3,232,895 | 2/1966 | Klein et al. | 260—78.4 |
| 3,460,982 | 8/1969 | Appelbaum | 96—87XR |

RONALD H. SMITH, Primary Examiner

U.S. Cl. X.R.

117—138.8